US012688037B2

(12) United States Patent
Pugh et al.

(10) Patent No.: US 12,688,037 B2
(45) Date of Patent: Jul. 21, 2026

(54) AUTOMATED DEVELOPER GOVERNANCE SYSTEM

(71) Applicant: HSBC Technology and Services (USA) Inc., Arlington Heights, IL (US)

(72) Inventors: Jonathan Michael Pugh, Sheffield (GB); Frank McGrath, London (GB); Easwaran Neelakandan, East Brunswick, NJ (US); James Golden, Township of Washington, NJ (US)

(73) Assignee: HSBC Technology and Services (USA) Inc., Arlington Heights, IL (US)

( * ) Notice: Subject to any disclaimer, the term of this patent is extended or adjusted under 35 U.S.C. 154(b) by 76 days.

(21) Appl. No.: 18/066,749

(22) Filed: Dec. 15, 2022

(65) Prior Publication Data

US 2023/0195455 A1 Jun. 22, 2023

Related U.S. Application Data

(60) Provisional application No. 63/265,802, filed on Dec. 21, 2021.

(51) Int. Cl.
*G06F 8/77* (2018.01)
(52) U.S. Cl.
CPC ..................................... *G06F 8/77* (2013.01)
(58) Field of Classification Search
CPC ........................................................ G06F 8/77
USPC ........................................................ 717/102
See application file for complete search history.

(56) References Cited

U.S. PATENT DOCUMENTS

| | | | | |
|---|---|---|---|---|
| 6,263,341 | B1 * | 7/2001 | Smiley ................. | G06F 16/288 |
| | | | | 707/999.102 |
| 8,650,535 | B2 * | 2/2014 | Lewis ....................... | G06F 8/00 |
| | | | | 717/162 |
| 9,823,996 | B2 * | 11/2017 | Kandpal ............. | G06F 11/3656 |
| 9,983,860 | B1 | 5/2018 | Koty et al. | |
| 10,180,836 | B1 * | 1/2019 | Arguelles ................. | G06F 8/75 |
| 10,318,412 | B1 * | 6/2019 | McKearney, Jr. ........ | G06F 8/60 |
| 10,838,846 | B1 | 11/2020 | Saleh-Esa | |
| 11,037,175 | B2 * | 6/2021 | Oden ............. | G06Q 10/063114 |
| 12,321,737 | B1 * | 6/2025 | Desai ....................... | G06F 8/71 |
| 2006/0155768 | A1 | 7/2006 | Weil et al. | |

(Continued)

OTHER PUBLICATIONS

PCT International Application No. PCT/US22/81679, International Search Report and Written Opinion of the International Searching Authority, dated Mar. 15, 2023, 14 pages.

(Continued)

*Primary Examiner* — Evral E Bodden
(74) *Attorney, Agent, or Firm* — DENTONS Durham Jones Pinegar

(57) ABSTRACT

A computing system receives a data object representative of a code repository for an application. The data object includes source code of the application and artifacts for satisfying a governance policy defined by an entity of the computing system. The computing system causes the data object to be provided to an automation tool configured to build, test, and deploy the application. The computing system monitors reports generated during building and testing of the application. The monitoring includes checking the reports for compliance with the governance policy. The computing system generates a report listing a compliance status of the governance policy.

19 Claims, 5 Drawing Sheets

(56)     References Cited

U.S. PATENT DOCUMENTS

| | | | |
|---|---|---|---|
| 2008/0222631 A1* | 9/2008 | Bhatia ................. | G06F 11/3604 |
| | | | 717/178 |
| 2012/0066671 A1 | 3/2012 | Adhikary et al. | |
| 2012/0311520 A1* | 12/2012 | Gupta ................. | G06F 11/3698 |
| | | | 717/102 |
| 2013/0067448 A1* | 3/2013 | Sannidhanam ........... | G06F 8/60 |
| | | | 717/169 |
| 2013/0212556 A1 | 8/2013 | Heyhoe et al. | |
| 2013/0219361 A1 | 8/2013 | Fiebig et al. | |
| 2014/0109114 A1* | 4/2014 | Mahiddini .............. | G06F 9/547 |
| | | | 719/328 |
| 2014/0189641 A1* | 7/2014 | Anderson ................. | G06F 8/71 |
| | | | 717/110 |
| 2014/0304678 A1 | 10/2014 | Zhang | |
| 2016/0350081 A1* | 12/2016 | Kumar ...................... | G06F 8/30 |
| 2020/0004604 A1* | 1/2020 | Lavoie ................. | G06F 16/907 |
| 2020/0304397 A1* | 9/2020 | Smith ................. | H04L 43/0882 |
| 2022/0119009 A1* | 4/2022 | Lee ...................... | B60W 40/10 |

OTHER PUBLICATIONS

Falco, et al., "Governing AI safety through independent audits,"
Nature Machine Intelligence 3.7, 2021, pp. 566-571.
European Patent Office, "extended European Search Report," for EP
Application No. 22912589.3, Mar. 20, 2025.

\* cited by examiner

Start                    400

Receive a box code for an application          402

Cause the box code to be transmitted to an automation tool          404

Monitor governance operations of the automation tool          406

Generate a report of the governance operations of the automation tool          408

Cause the application to be deployed          410

End

AUTOMATED DEVELOPER GOVERNANCE SYSTEM

CROSS-REFERENCE TO RELATED APPLICATIONS

This application claims priority to U.S. Provisional Application Ser. No. 63/265,802, filed Dec. 21, 2021, which is hereby incorporated by reference in its entirety.

FIELD OF THE DISCLOSURE

Embodiments disclosed herein generally relate to developer governance module and, in particular, a developer governance module that extends the scope of governance processes typically required by development teams at scale.

BACKGROUND

In large companies, the process for developing an application or software for the company or a client is a demanding task. As the number of developers grow for a complex application, so too are the number of environments in which aspects of the application are developed. To ensure that applications are developed properly, a company may establish a set of governance standards that define quality checks on the application before the application can or should be deployed. While the governance standards are sensible in practice, complying with the governance standards is often a time-consuming task that developers are too busy to address. As a result, developers have the tendency to forgo certain governance requirements and instead deploy an application or updates to an application without performing the necessary operations.

SUMMARY

In some embodiments, a method is disclosed herein. A computing system receives a data object representative of a code repository for an application. The data object includes source code of the application and artifacts for satisfying a governance policy defined by an entity of the computing system. The computing system causes the data object to be provided to an automation tool configured to build, test, and deploy the application. The computing system monitors reports generated during building and testing of the application. The monitoring includes checking the reports for compliance with the governance policy. The computing system generates a report listing a compliance status of the governance policy.

In some embodiments, a system is disclosed herein. The system includes a processor and a memory. The memory includes programming instructions stored thereon, which, when executed by the processor, causes the system to perform operations. The operations include receiving a data object representative of a code repository for an application. The data object includes source code of the application and artifacts for satisfying a governance policy defined by an entity of the computing system. The operations further include causing the data object to be provided to an automation tool configured to build, test, and deploy the application. The operations further include monitoring reports generated during building and testing of the application. The monitoring includes checking the reports for compliance with the governance policy. The operations further include generating a report listing a completion status of the governance policy.

In some embodiments, a non-transitory computer readable medium is disclosed herein. The non-transitory computer readable medium has one or more sequences of instructions, which, when executed by a processor, causes a computing system to perform operations. The operations include receiving, by the computing system, a data object representative of a code repository for an application. The data object includes source code of the application and artifacts for satisfying a governance policy defined by an entity of the computing system. The operations further include causing, by the computing system, the data object to be provided to an automation tool configured to build, test, and deploy the application. The operations further include monitoring, by the computing system, reports generated during building and testing of the application. The monitoring includes checking the reports for compliance with the governance policy. The operations further include generating, by the computing system, a report listing a compliance status of the governance policy.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Generally, within large corporate environment, there are certain governance requirements for software development. For example, large corporate environments, may require that all technology work be controlled, traceable, compliant, and auditable. Controlled may refer to a requirement that changes must be released following a prescribed process. Traceable may refer to a requirement that changes must be tracked to determine who made those changes and why they made those changes. Compliant may refer to a requirement that developers follow standard practices for elements, such as security elements, that evolve with the environment.

Auditable may refer to a requirement that evidence be retained to demonstrate the controlled, traceable, and compliant requirements.

Large organizations, however, typically face a variety of challenges when trying to meet these governance requirements. First, a globally dispersed and mobile workforce increases the difficulty in creating process consistency across developers. Second, delivery pressures can distract away from governance requirements, thus leading to poor quality of technology. Third, governance practices can be hard to follow as they are typically defined from various perspectives (e.g., from various parties) and constantly evolve. Such difficult governance practices can negatively impact responsiveness of developers and time-to-market for products. Finally, risks associated with potential governance failures may be converted to financial set-aside measure to mitigate risk, thereby reducing the capital available.

To address these deficiencies, one or more techniques described herein provide a developer governance module that extends the scope of governance processes typically required by development teams at scale. Developer governance module provides a fully auditable and automated approach to developer governance by providing a solution rooted in version control. In this manner, developer governance module provides organizations with a governance-as-a-code solution, in which actions associated with the automation and changes are treated "as code" (e.g., versionable).

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described. In some embodiments, a user may be representative of a developer affiliated with back end computing system 104 described below.

Figure 1:
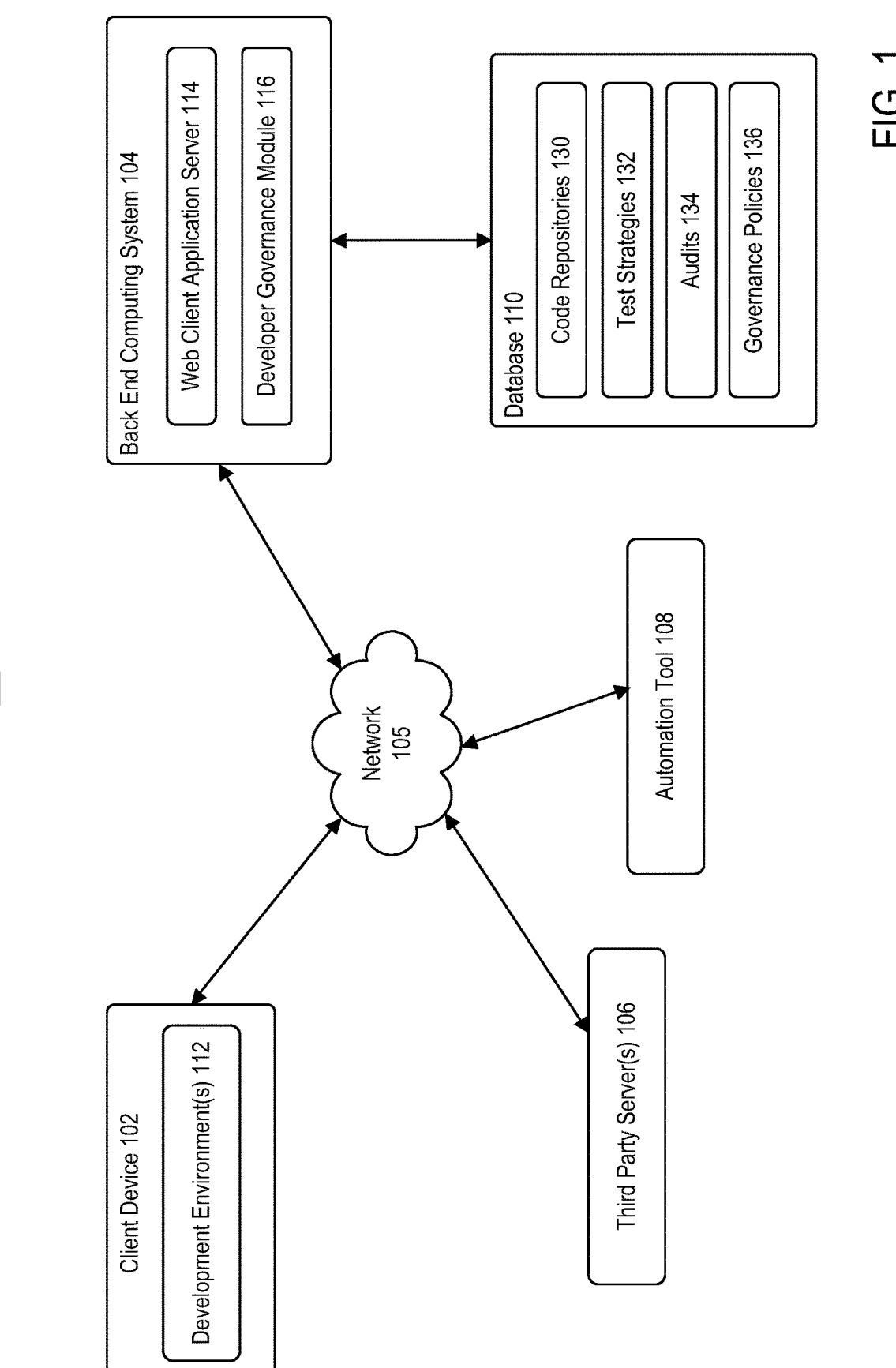
FIG. 1 is a block diagram illustrating a computing environment, according to one exemplary embodiment.

FIG. 1 is a block diagram illustrating a computing environment 100, according to one embodiment. Computing environment 100 may include at least a client device 102, a back end computing system 104, one or more third party servers 106, and an automation tool 108 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wireless fidelity (Wi-Fi™), ZigBee™, ambient backscatter communication (ABC) protocols, Universal Serial Bus (USB), Wide Area Network (WAN), or Local Area Network (LAN). Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receiving information between the components of computing environment 100.

Client device 102 may be in communication with back end computing system 104 via network 105. Client device 102 may be operated by a user. For example, client device 102 may be a mobile device, a tablet, a desktop computer, or any computing system having the capabilities described herein. Users may include, but are not limited to, individuals such as, for example, developers or employees of an entity associated with back end computing system 104.

Client device 102 may include one or more development environments 112. Development environments 112 may be representative of applications that allow a developer to develop computer programs for back end computing system 104. For example, a development environment 112 may be representative of Spring®, an application framework, that allows, for example, a user to develop an application programming interface (API). In another example, a development environment 112 may be representative of Docker® that allows, for example, a user to provision a container. In another example, a development environment 112 may be representative of Ansible® that allows, for example, a user to develop a playbook. In another example, a development environment 112 may be representative of Puppet®. In another example, a development environment 112 may be representative of Chef® that allows, for example, a user to develop a recipe. In operation, a user or developer may utilize development environments 112 to develop code to be added to a code repository or codebase for an application.

Back end computing system 104 may include web client application server 114 and developer governance module 116. Developer governance module 116 may be comprised of one or more software modules. The one or more software modules may be collections of code or instructions stored on a media (e.g., memory of back end computing system 104) that represent a series of machine instructions (e.g., program code) that implements one or more algorithmic steps. Such machine instructions may be the actual computer code the processor of back end computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Developer governance module 116 may be configured within a continuous integration/continuous deployment pipeline. For example, developer governance module 116 may be called when changes to an application are developed and are ready to be pushed to a code repository associated with the application. Developer governance module 116 may interact with automation tool 108, responsive to detecting an update or change to a code repository. Automation tool 108 may be configured to build, test, and deploy the application. Developer governance module 116 may perform one or more operations to ensure that the build, test, and deploy operations of automation tool 108 are compliant with the developer governance that is established for that application.

In some embodiments, automation tool 108 may communicate with one or more third party servers 106 during the building, testing, and deploying of the application. Exemplary third party servers 106 include, but are not limited to, Jira, Chef, Ansible, Confluence, Splunk, and the like.

Back end computing system 104 may communicate with database 110. Database 110 may be representative of one or more databases configured to store code repositories for applications associated with back end computing system 104. As shown, database 110 may include code repositories 130, test strategies 132, audits 134, and governance policies 136.

Code repositories 130 may be representative of source code associated with an application offering from back end computing system 104. Examples of code repositories are discussed in more detail below in conjunction with FIGS. 2 and 3. The structure of code repositories 130 allow for automated governance operations during the Continuous Integration/Continuous Delivery (CI/CD) pipeline of an application.

Test strategies 132 may be representative of an outline that describes the testing for an application associated with back end computing system 104. For example, test strategies 132 may define how each application is tested, in accordance with rules generated by a requesting entity (e.g., client).

Audit 134 may be representative of a governance audit for an application. Audit 134 may be generated by developer governance module 116. Audit 134 may include a breakdown of each of the governance processes required by an administrator or a client, as well as a completion status for each governance process.

Governance policies 136 may define the governance policies set by an enterprise. Governance policies 136 may be accessed by developer governance module 116 when performing the governance audit.

Figure 2:
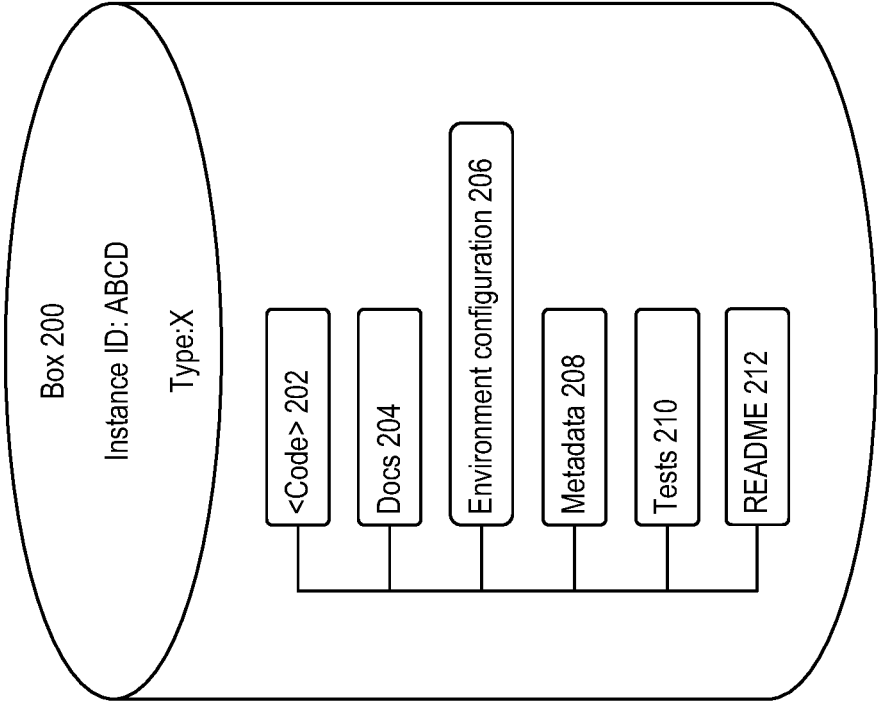
FIG. 2 is a block diagram that illustrates a code box corresponding to a code repository for an application, according to example embodiments.

FIG. 2 is a block diagram that illustrates a code box 200 corresponding to a code repository for an application, according to example embodiments.

To help facilitate this process, an everything-as-code approach is taken in which the governance requirements for an application, such as audit, change control, compliance evidence, etc., are encapsulated in code. Such encapsulation may refer to "code box" 200. Code box 200 may include therein artifacts which are required to meet the expectations of associated governance policies. In some embodiments, code box 200 may further include metadata that describes which set or combination of governance policies should be applied. As shown, code box 200 may include code 202, documents ("docs") 204, environment configuration 206, metadata 208, tests 210, and a read me file ("README") 212.

Code 202 may refer to the actual code that is developed by a developer (e.g., client device 102). This code represents that actual functionality that delivers the purposes of the application. During the CI/CD process, the code that is being developed, changed, modified, etc., is pushed to code 202 following a governance check by developer governance module 116.

Documentation 204 may represent standardized secure controls framework (SCF) compliance documents. The SCF compliance documents may represent the safeguards to avoid, detect, counteract, or minimize security risks for the application. When modified code or new code is pushed to developer governance module 116 for analysis, developer governance module 116 may determine whether the requisite safeguards are in place before pushing the modified code or new code to code 202. In some embodiments, developer governance module 116 may check for the appropriate documentation by calling to locations of any documentation defined in documentation 204.

Environment configuration 206 may represent the configuration for every environment in which the application represented by code 202 is deployed. For example, environment configuration 206 may include the various environments in which application may be used, as well as the variables defined for each environment. Before new or modified code is pushed to code 202, developer governance module 116 may check environment configuration 206 to ensure that the relevant environment configurations are in place.

Metadata 208 may be representative of data that configures or defines the delivery process for the application. Exemplary data may include, but is not limited to, global service desk (GSD) details, publishing portals, ownership information, dependent pattern health checks to be run, and the like. Metadata 208 may further define the location at which the metadata will be stored.

Tests 210 may be representative of defining the tests associated with the application. In some embodiments, tests 210 may further define the testing parameters or specifications for the tests associated with the application. For example, tests 210 may include the testing service (e.g., Jira) and the parameters or specifications for the Jira testing. Tests 210 may further define the location at which the tests results will be stored.

README 212 may be representative of a read me file associated with the application. README 212 may explain the functionality of the application.

One of the benefits of defining the code repository of an application as code box 200 is that it allows a user or developer to only deal with the box; no longer does the user need to switch contexts to deliver the new code or code update to code repository. Instead, all documentation, including documents required for process compliance such as security design, build configuration for automated packaging, deployment configuration for automated delivery, publishing and reporting configurations, and metadata to parameterize the automated delivery processes (e.g., to identify change governance owning teams) are treated "as code."

When delivery of code box 200 is initiated, code box 200 may be provided to an automation tool, such as Jenkins. Automation tool may read code box 200 to determine how to build, test, and deploy the software, in accordance with the instructions defined in code box 200. Developer governance module 116 may be called to check whether all the necessary documentation is in place following passage to the automation tool. For example, developer governance module 116 may scan locations that are associated with storage of the test results from the various third party testing services and the metadata. In this manner, code box 200, automation tool, and developer governance module 116 may work together to verify, build, test, deliver and publish each code box 200 type, including the organizational governance aspects. Such automation removes these the burden from developers to satisfy the governance operations and provides a means to standardize all governance aspects, thus ensuring a high quality compliant delivery of the application every time.

Figure 3:
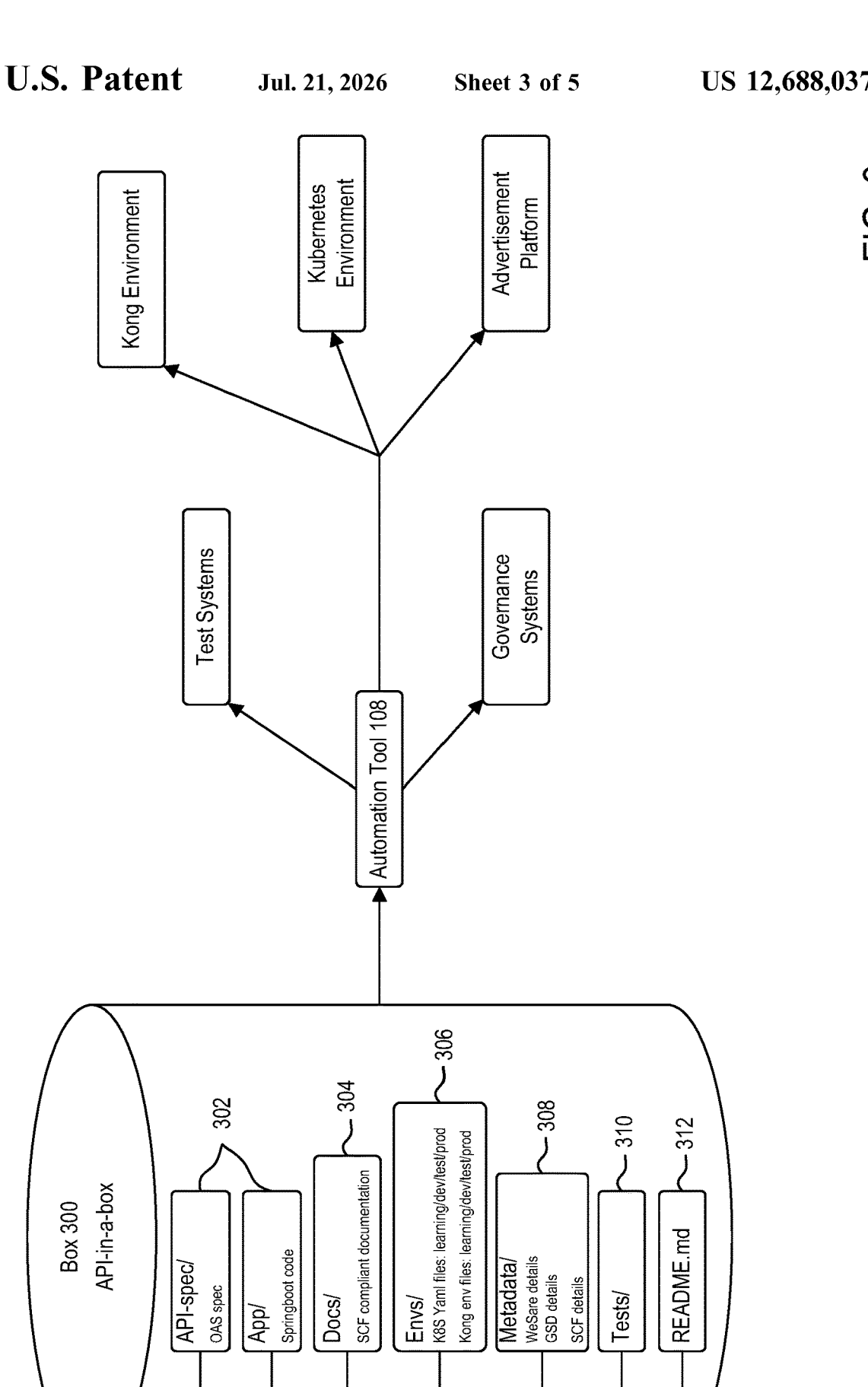
FIG. 3 is a block diagram illustrating functionality of developer governance module, according to example embodiments.

FIG. 3 is a block diagram illustrating functionality of developer governance module 116, according to example embodiments.

As shown, the code box in the present example is an API-type code box 300 (e.g., "API-in-a-box"). In other words, the code repository associated with API code box 300 is for an API. code box 300 includes code 302, documents ("docs") 304, environment configuration 306, metadata 308, tests 310, and a read me file ("README") 312. Code 302 may define the code underlying the API and the API specification. As shown, the API specification is OpenAPI Specification (OAS). The code underlying the API may have been developed using Springboot.

Documentation 304 includes the SCF compliance documentations for the API. Environment configuration 306 may define the environments in which the API will be deployed. As shown, the API will be deployed in a Kubernetes environment and a Kong environment. Metadata 308 includes the GSD details, publication details, and/or SCF details for the application. Tests 310 define the governance test for the application.

When a developer is ready to deliver an update to the API, developer may provide the code box to the automation tool. The automation tool may read code box 300 to determine how to build, test, and deploy the software, in accordance with the instructions defined in code box 300. For example, as shown, the automation tool may initiate the tests as defined in code box 300, such as test runners and cyberflows. The automation tool may further read code box 300 to ensure that all governance operations (e.g., GSD) with external tools such as, but not limited to, Jira, Confluence, Splunk, and the like. The automation tool may then deploy code 202 within Kong and Kubernetes in accordance with environment configuration 306. The automation tool may further publish the application in accordance with metadata 308.

Developer governance module 116 may ensure that all governance operations are performed and logged before deployment. For example, developer governance module 116 may search a location specified in code box 300 for a report from one of the external governance tools. In some embodiments, developer governance module 116 may compare the governance reports generated by one or more external tools to testing parameters defined in code box 300 to determine whether the correct governance operations have been performed.

Following the scanning, developer governance module 116 may generate a governance reports that indicates whether governance policies 136 associated with the application have been performed. If a governance check has not been performed (e.g., changes were not logged, a test strategy was not updated, etc.), developer governance module 116 may flag the application before it is deployed. Developer governance module 116 may notify the developer of the deficiency.

Figure 4:
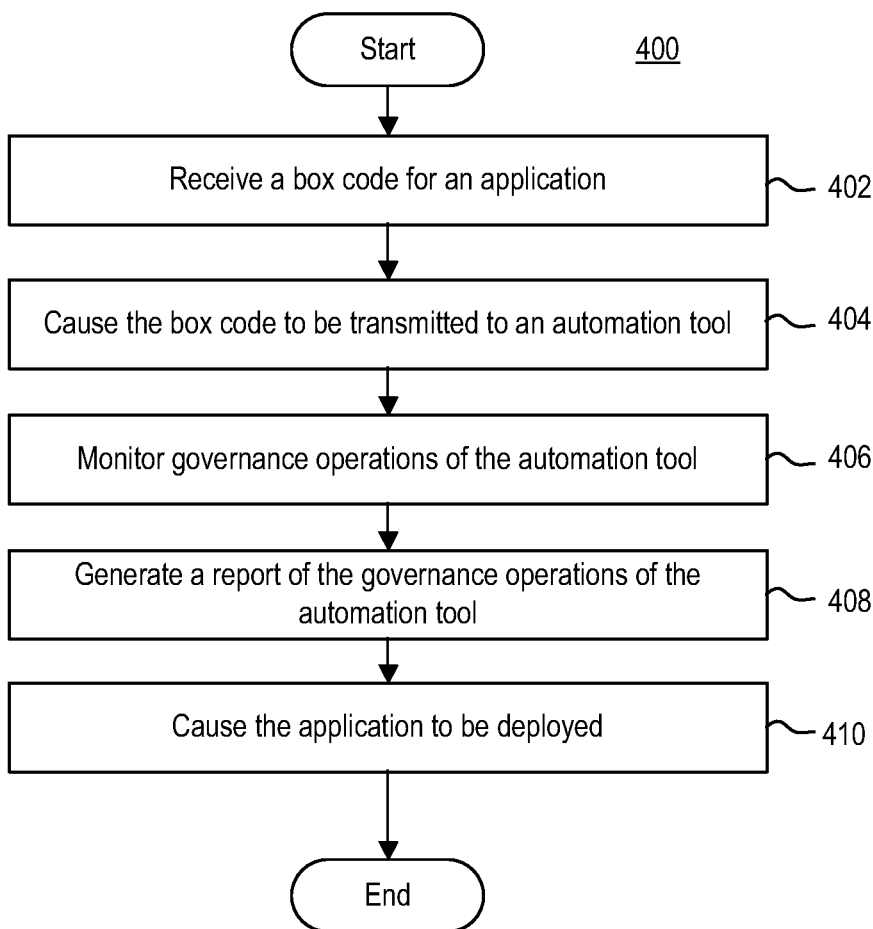
FIG. 4 is a flow diagram illustrating a method of deploying an application update, according to example embodiments.

FIG. 4 is a flow diagram illustrating a method 400 of deploying an application update, according to example embodiments. Method 400 may begin at step 402.

At step 402, back end computing system 104 may receive a code box for an application. The code box may include therein standards for the type of automation type represented by the box. For example, the code box may include source code, documents ("docs") associated with the application, environment configuration information, metadata associated with the application, test parameters for the application, and a read me file. The code box may be representative of the code repository for an application. By defining the code repository as code box 200, a user or developer only has to interact with the box; no longer does the user need to switch contexts to deliver the new code or code update to code repository. Instead, all documentation, including documents required for process compliance such as security design, build configuration for automated packaging, deployment configuration for automated delivery, publishing and reporting configurations, and metadata to parameterize the automated delivery processes (e.g., to identify change governance owning teams) are treated "as code."

At step 404, back end computing system 104 may cause the code box to be transmitted to automation tool 108. In some embodiments, upon detecting a change to code repository that is to be pushed to the application, back end computing system 104 may cause the code box for the application to be provided to automation tool 108. Automation tool 108 may be configured to build, test, and deploy the application in accordance with the parameters defined in the code box.

At step 406, back end computing system 104 may monitor governance operations of automation tool 108. For example, developer governance module 116 may monitor locations at which test results from third party servers 106 will be stored to ensure that the application undergoes the necessary testing prescribed by an administrator or client. In some embodiments, developer governance module 116 may further monitor locations at which metadata associated with the testing and governance requirements will be stored.

At step 408, back end computing system 104 may generate a report of the governance operations of the automation tool. For example, based on the monitoring, developer governance module 116 may generate a report that lists a completion status for each of the testing and governance requirements prescribed by the administrator or client.

At step 410, back end computing system 104 may cause the application to be deployed. For example, upon determining that developer governance module 116 has indicated that the application is compliant with the testing and governance requirement prescribed by the administrator or client, back end computing system 104 may notify automation tool 108, such that automation tool 108 can deploy the application or application update in accordance with the parameters defined in the code box.

In this manner, code box, automation tool 108, and developer governance module 116 may work together to verify, build, test, deliver and publish each code box type, including the organizational governance aspects. Such automation removes these the burden from developers to satisfy the governance operations and provides a means to standardize all governance aspects, thus ensuring a high quality compliant delivery of the application every time.

Figures 5A, 5B:
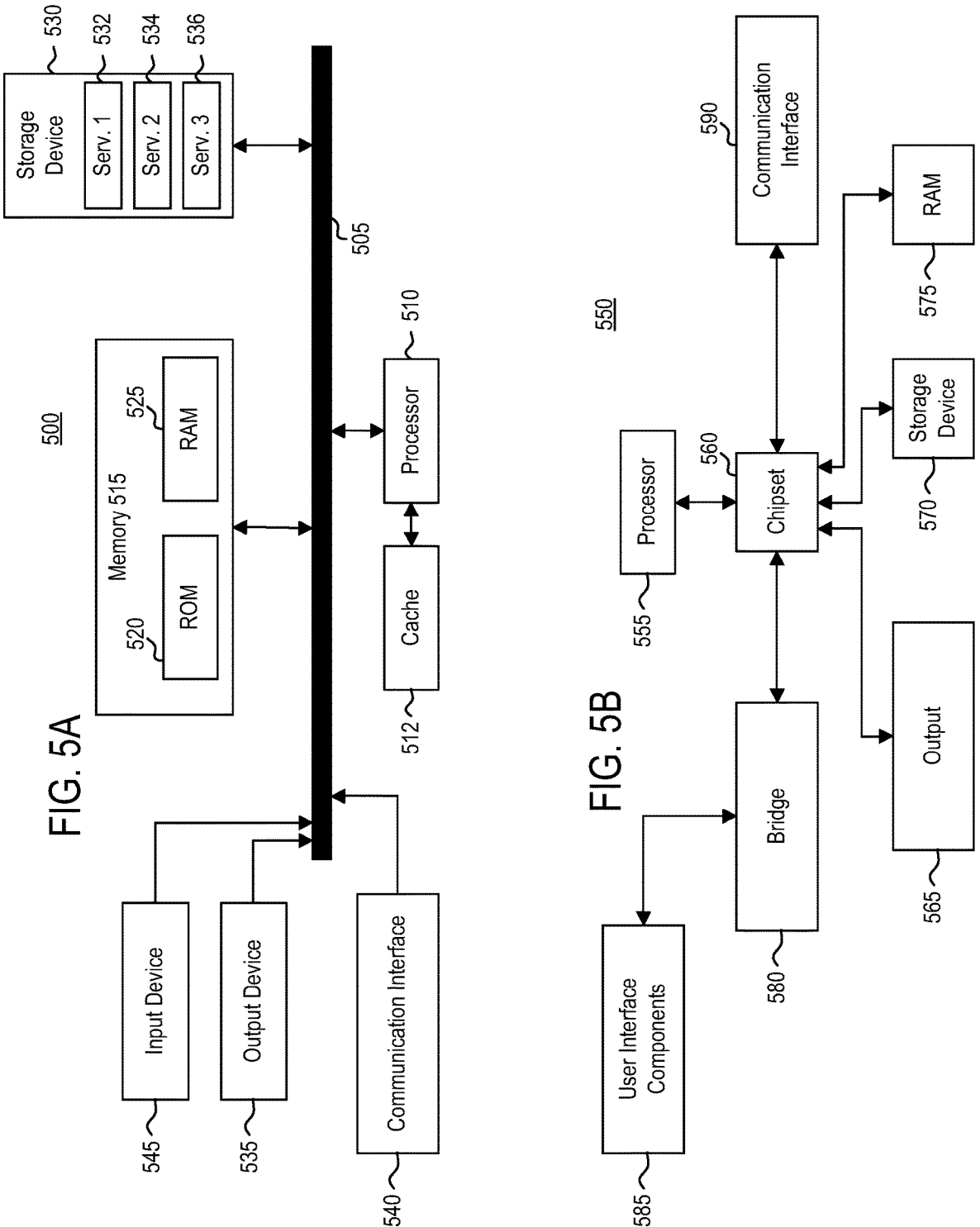
FIG. 5A illustrates an architecture of system bus computing system, according to example embodiments.
FIG. 5B illustrates a computer system having a chipset architecture, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 3 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 which can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
receiving, by a computing system, a data object representative of a code repository for an application, the data object being an application programming interface (API)-type code box comprising:
source code of the application; and
a plurality of API-specific code artifacts for satisfying at least one governance condition defined by an entity of the computing system, the plurality of API-specific code artifacts including a documents code portion, an environment configuration code portion that specifies one or more environments in which the application will be executed, a metadata code portion that specifies the at least one governance condition to be satisfied, and a tests code portion;
causing, by the computing system, the data object to be provided to an automation tool that builds, tests, and deploys the application;
monitoring, by the computing system, operations of the automation tool during building and testing of the application, wherein the monitoring comprises:
receiving, by a communication interface of the computing system, a network transmission including the data object;

monitoring, by a processor of the computing system, one or more memory locations corresponding to storage of third-party test results based on the data object; and in response to the monitoring of the one or more memory locations, automatically determining whether the data object satisfies the at least one governance condition; and in response to determining the data object satisfies the at least one governance condition, automatically deploying the application.

2. The method of claim 1, wherein automatically deploying the application comprises deploying the application in a target deployment environment in accordance with deployment parameters defined in the data object.

3. The method of claim 1, further comprising monitoring, by the computing system, locations in a file system to identify expected metadata generated by the automation tool.

4. The method of claim 1, wherein the documents code portion of the API-type code box defines a memory storage location of a standardized secure controls framework (SFC) compliance document for the source code.

5. The method of claim 1, wherein the environment configuration code portion of the API-type code box defines one or more environment configuration variables for the source code.

6. The method of claim 1, wherein the metadata code portion of the API-type code box defines:

a delivery process configuration for the source code; and a memory storage location for the metadata code portion.

7. The method of claim 1, wherein the tests code portion of the API-type code box defines:

one or more test parameters for the source code; and a memory storage location for test results.

8. The method of claim 1, further comprising generating a report that lists a compliance status of the governance condition.

9. A system, comprising:

a memory having programming instructions stored thereon; and a processor configured to execute the programming instructions to cause the processor to perform operations, comprising:

receiving a data object representative of a code repository for an application, the data object being an API-type code box, and comprising:

source code of the application; and a plurality of API-specific code artifacts for satisfying at least one governance condition defined by an entity associated with the system, the plurality of API-specific code artifacts including a documents code portion, an environment configuration code portion that specifies one or more environments in which the application will be executed, a metadata code portion that specifies the at least one governance condition to be satisfied, and a tests code portion;

causing the data object to be provided to an automation tool configured to build, test, and deploy the application;

monitoring operations of the automation tool during building and testing of the application, wherein the monitoring comprises:

receiving a network transmission including the data object;

monitoring one or more memory locations corresponding to storage of third-party test results based on the data object; and in response to the monitoring of the one or more memory locations, automatically determining whether the data object satisfies the at least one governance condition; and in response to determining the data object satisfies the at least one governance condition, automatically deploying the application.

10. The system of claim 9, wherein automatically deploying the application comprises deploying the application in a target deployment environment in accordance with deployment parameters defined in the data object.

11. The system of claim 9, wherein the operations further comprise causing the application to be published in accordance with publication parameters defined in the data object.

12. The system of claim 9, wherein the operations further comprise generating, based on the monitoring of the operations of the automation tool, a report listing a compliance status of the at least one governance condition.

13. The system of claim 12, wherein the operations further comprise:

detecting a change to the code repository corresponding to an update to the application;

upon detecting the change, causing an updated data object with the change to be provided to the automation tool configured to build, test, and deploy the update;

monitoring additional reports generated during the building and the testing of the application, wherein the monitoring comprises checking the additional reports for compliance with the at least one governance condition; and generating an updating report listing an updated compliance status of the at least one governance condition.

14. The system of claim 13, wherein the operations further comprise:

determining that the at least one governance condition has been satisfied; and based on the determining that the at least one governance condition has been satisfied, causing the update to be deployed.

15. A non-transitory computer readable medium having one or more sequences of instructions, which, when executed by a processor, causes a computing system to perform operations, comprising:

receiving, by the computing system, a data object representative of a code repository for an application, the data object being an API-type code box, comprising:

source code of the application; and a plurality of API-specific code artifacts for satisfying at least one governance condition defined by an entity of the computing system, the plurality of API-specific code artifacts including a documents code portion, an environment configuration code portion that specifies one or more environments in which the application will be executed, a metadata code portion that specifies the at least one governance condition to be satisfied, and a tests code portion;

causing, by the computing system, the data object to be provided to an automation tool configured to build, test, and deploy the application;

monitoring, by the computing system, operations of the automation tool during building and testing of the application, wherein the monitoring comprises:

receiving, by a communication interface of the computing system, a network transmission including the data object;

monitoring, by the processor of the computing system, one or more memory locations corresponding to storage of third-party test results based on the data object; and in response to the monitoring of the one or more memory locations, automatically determining whether the data object satisfies the at least one governance condition; and in response to determining the data object satisfies the at least one governance condition, automatically deploying the application.

16. The non-transitory computer readable medium of claim 15, wherein automatically deploying the application comprises deploying the application in a target deployment environment in accordance with deployment parameters defined in the data object.

17. The non-transitory computer readable medium of claim 15, further comprising causing, by the computing system, the application to be published in accordance with publication parameters defined in the data object.

18. The non-transitory computer readable medium of claim 15, further comprising generating, by the computing system and based on the monitoring of the operations of the automation tool, a report listing a compliance status of the at least one governance condition.

19. The non-transitory computer readable medium of claim 18, further comprising:

detecting, by the computing system, a change to the code repository corresponding to an update to the application;

upon detecting the change, causing, by the computing system, an updated data object with the change to be provided to the automation tool configured to build, test, and deploy the update;

monitoring, by the computing system, additional reports generated during the building and the testing of the application, wherein the monitoring comprises checking the additional reports for compliance with the at least one governance condition; and generating, by the computing system, an updating report listing an updated compliance status of the at least one governance condition.

* * * * *